United States Patent [19]

Johnson

[11] 4,000,886
[45] Jan. 4, 1977

[54] FURNACE EXHAUST DUCT
[75] Inventor: Frank N. Johnson, Fulton, Ill.
[73] Assignee: J. T. Cullen Company, Fulton, Ill.
[22] Filed: Mar. 24, 1975
[21] Appl. No.: 561,254
[52] U.S. Cl. .............................. 266/147; 266/158; 122/7 A
[51] Int. Cl.² .......................................... C21B 3/00
[58] Field of Search ................ 266/15, 16, 17, 144, 266/146, 147, 158; 165/169; 60/267, 39.5; 122/7 R, 7 A

[56] References Cited
UNITED STATES PATENTS

| | | | |
|---|---|---|---|
| 3,026,102 | 3/1962 | McFeathers | 266/15 X |
| 3,320,931 | 5/1967 | Durham | 266/15 |
| 3,347,539 | 10/1969 | Mitchell et al. | 266/35 |
| 3,372,917 | 3/1968 | Richardson | 266/15 |
| 3,379,426 | 5/1968 | Reuter et al. | 266/15 X |

FOREIGN PATENTS OR APPLICATIONS

| | | | |
|---|---|---|---|
| 1,279,047 | 10/1968 | Germany | 266/15 |
| 724,740 | 2/1955 | United Kingdom | 122/7 A |
| 891,112 | 3/1962 | United Kingdom | 122/7 A |

OTHER PUBLICATIONS
Babcock and Wilcox Brochure, 1962, "The New Bond W Oxygen Furnace Hood."
Jet Propulsion for Aerospace Applications, 1964, Second Ed., Hesse, W. J. and Mumford Jr., N. V. S.; Pitman Publishing Corp., p. 492.

Primary Examiner—Roy Lake
Assistant Examiner—Paul A. Bell
Attorney, Agent, or Firm—Coffee and Sweeney

[57] ABSTRACT

An exhaust duct for use with a direct evacuation exhaust decontamination system of a blast furnace or steel converter. The exhaust duct includes a main support coolant inlet conduit and a plurality of coolant return conduits arranged in a generally circular pattern to define an exhaust duct having a circular cross section for the evacuation of exhaust gases from a furnace. The inlet conduit and the return cooling conduits are connected to a distribution manifold on one end so that all of the coolant enters the exhaust duct through the main coolant supply conduit and is returned and discharged through the smaller cooling conduits which thereby serve to maintain the exhaust duct at a relatively low temperature to prevent oxidation or destruction of the duct walls by the exhaust gases. The discharged coolant may be directed into the exhaust gases at the end of the exhaust duct for use in a "wet" exhaust cleansing system or collected in a trough or manifold when used with a "dry" exhaust cleansing system. Each cooling conduit includes a flow control device to regulate the amount of coolant flowing therethrough. The furnace exhaust duct is removably mounted over the furnace roof or chimney to facilitate movement of the duct for recharging of the furnace.

19 Claims, 12 Drawing Figures

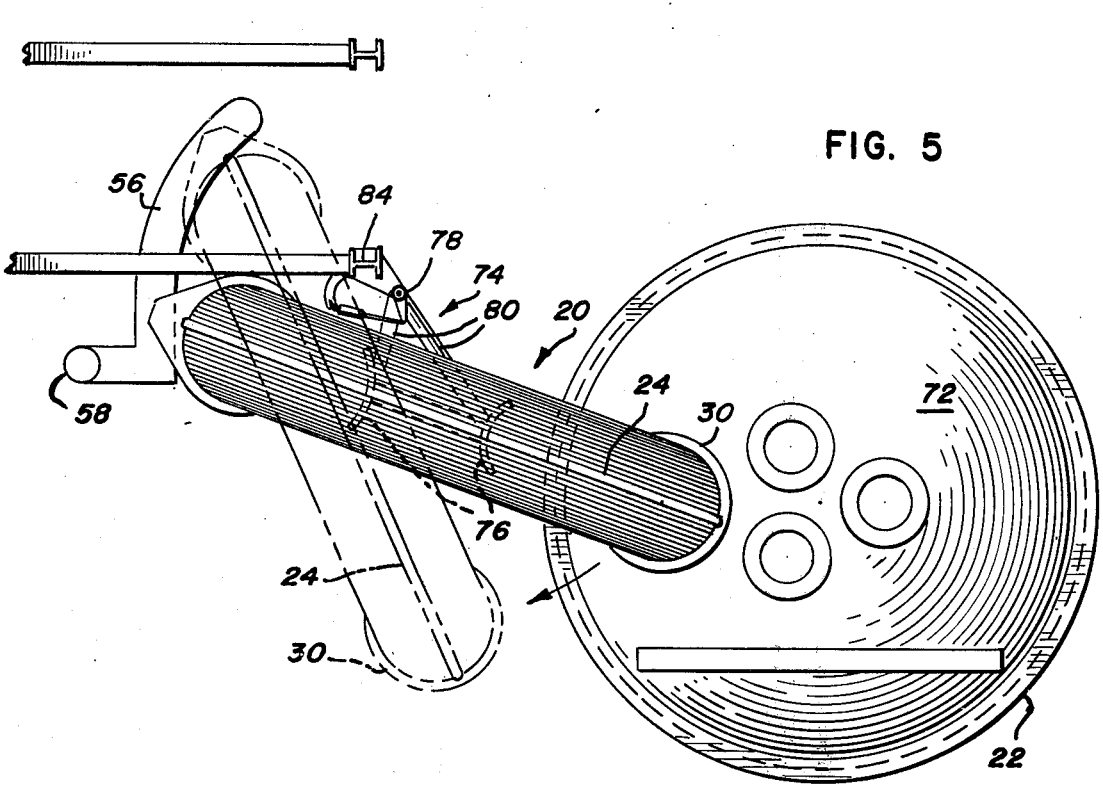
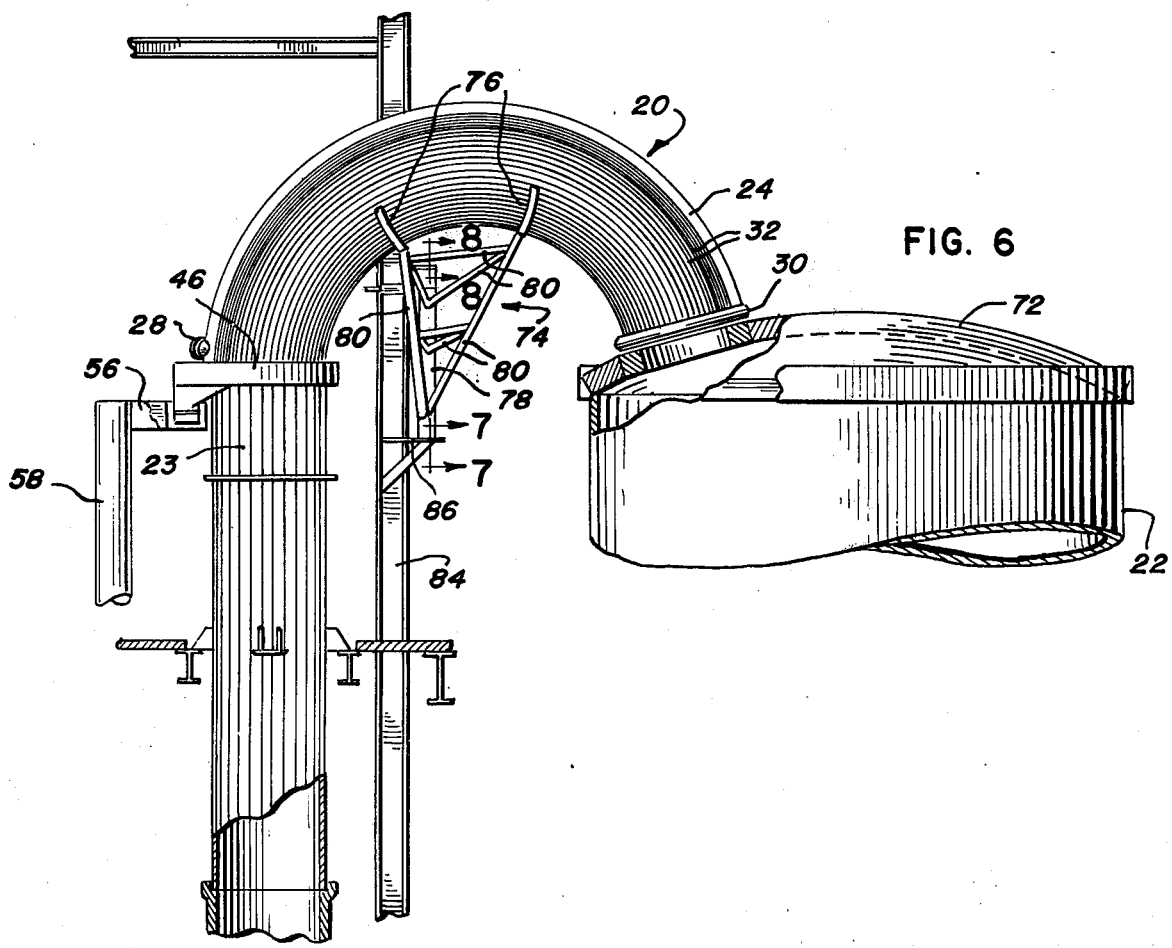

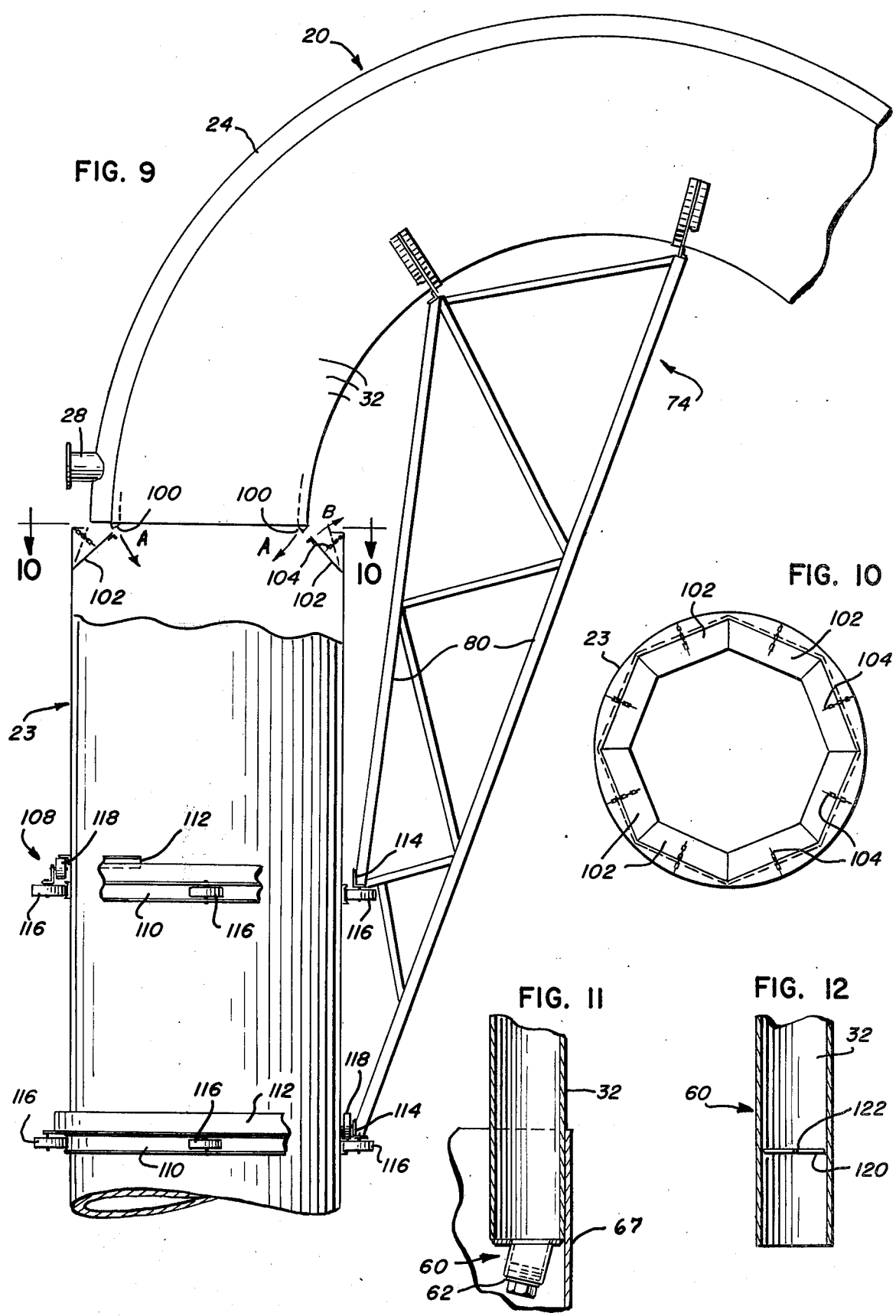

FURNACE EXHAUST DUCT

BACKGROUND AND SUMMARY OF THE INVENTION

With the advent of pollution control laws, a desire and need for an efficient, long lasting furnace exhaust duct system has become crucially important, especially in the field of steel manufacturing. Exhaust fumes, particularly from steel making furnaces, such as the Bessemer converters and electric arc furnaces, contain a large amount of very hot pollutant and combustible contaminants which must be removed from the exhaust gases before they can be exhausted to the atmosphere. The steel making furnaces, since they must operate at a temperature substantially higher than that required to melt the steel, emit exhaust gases at relatively high temperatures which damage and rapidly deteriorate conventional duct work either through oxidation or actual melting and rupturing of the duct work. Several types of fluid cooled exhaust duct work systems have been proposed to eliminate this failure problem but many if not all of such proposals have been found to be unsatisfactory and extremely costly. Failure is often caused by a non-uniform thermal expansion of the inside and outside wall of some of the water cooled, double wall type exhaust ducts and the use of expansion joints to solve this problem has proven unsatisfactory.

SUMMARY OF THE INVENTION

It is the object of the present invention to provide a new, inexpensive and longlasting furnace exhaust duct system that is capable of withstanding the high temperature and corrosive effect of furnaces of this type and which can be manufactured at a reasonable cost.

In accordance with the object of the present invention, a furnace exhaust duct is provided for use with a furnace such as a steel making furnace, which operates at a relatively high temperature. The exhaust duct includes a main support conduit which serves to support the duct and to provide an inlet conduit for a suitable fluid coolant. The support conduit is connected on one end to a generally circular distribution manifold which is in fluid communication with a plurality of coolant return conduits. The coolant return conduits are secured to one another in a side-by-side circular arrangement to provide an exhaust duct interiorly thereof. The coolant conduits each receive a portion of the cooling fluid from the manifold which travels along the conduits for substantially the entire length of the duct whereafter the coolant is discharged at an elevated temperature. Each coolant return conduit includes flow control means therein for regulating the amount of coolant flowing through each tube. The invention includes a pivotally mounted support cradle for the exhaust duct to facilitate movement of the exhaust duct when the furnace requires recharging.

BRIEF DESCRIPTION OF THE DRAWINGS

FIG. 5 is a top plan view of the exhaust duct shown in FIG. 6 showing in phantom the exhaust duct in its removed or recharging position;

FIG. 6 is a side elevational view, on a reduced scale, showing the exhaust duct and mounting support in relation to the furnace and vertical stack which also are shown partially fragmented;

FIG. 7 is a vertical section, on an enlarged scale, of the lower cradle bearing support, taken generally along the line 7—7 of FIG. 5;

FIG. 8 is a vertical section, on an enlarged scale, of the upper cradle bearing support, taken generally along the line 8—8 of FIG. 5;

FIG. 9 is an alternate embodiment of the exhaust duct of the present invention including an alternate mounting means;

FIG. 10 is a horizontal section of a portion of the vertical stack taken generally along the line 10—10 of FIG. 9;

FIG. 11 is a vertical section of one of the flow control reducers taken generally along the line 11—11 of FIG. 2; and FIG. 12 is a vertical section similar to FIG. 11 showing an alternate embodiment of one of the flow control devices of the present invention.

Figure 1:
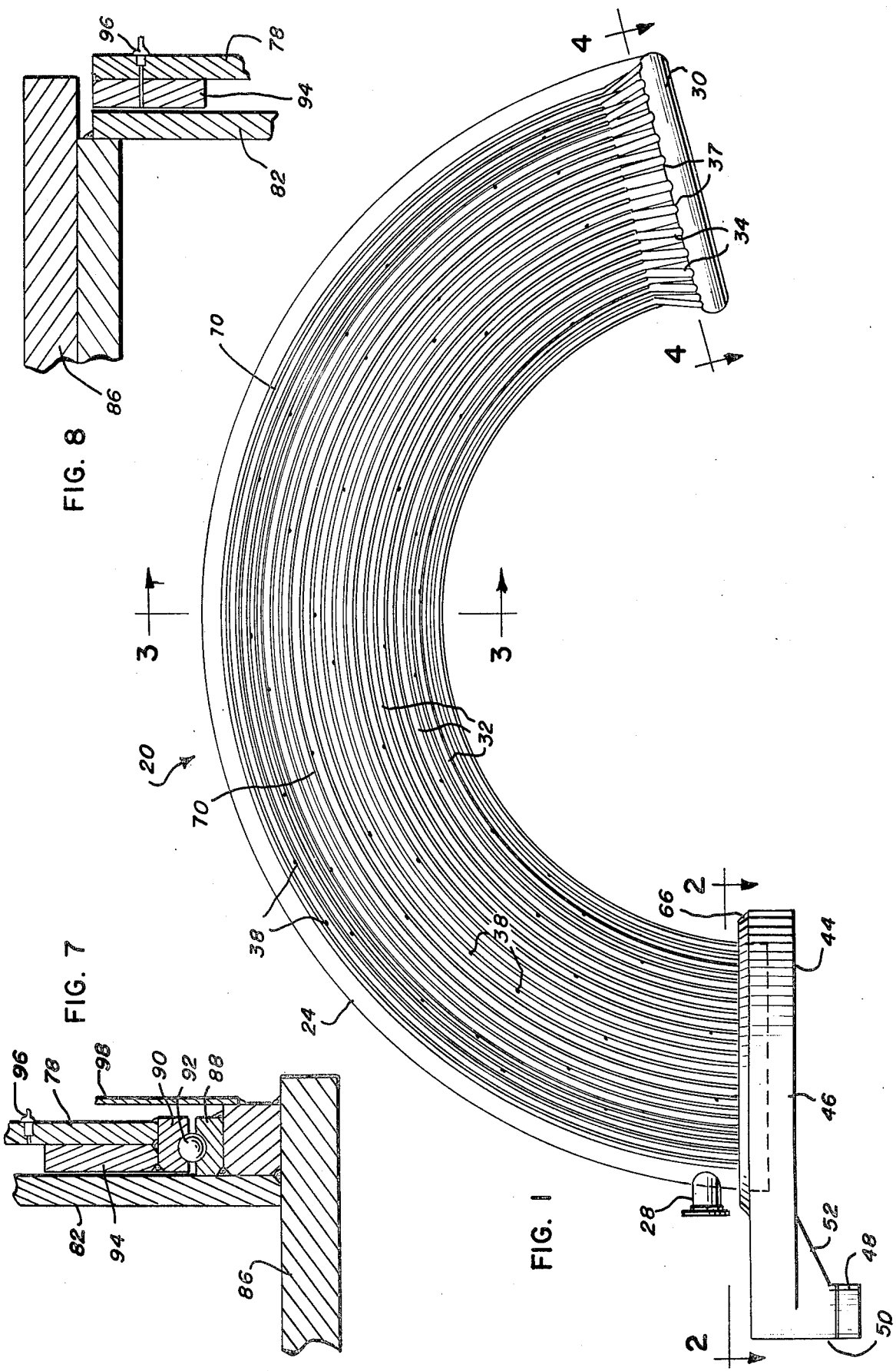
FIG. 1 is a side elevational view of an exhaust duct made in accordance with the concepts of the present invention.

While this invention is susceptible of embodiments in many different forms there are shown in the drawings and will herein be described in detail specific embodiments thereof, with the understanding that the present disclosure is to be considered as an exemplification of the principles involved and is not intended to limit the invention to the embodiments shown.

DESCRIPTION OF THE PREFERRED EMBODIMENT

Figure 3:
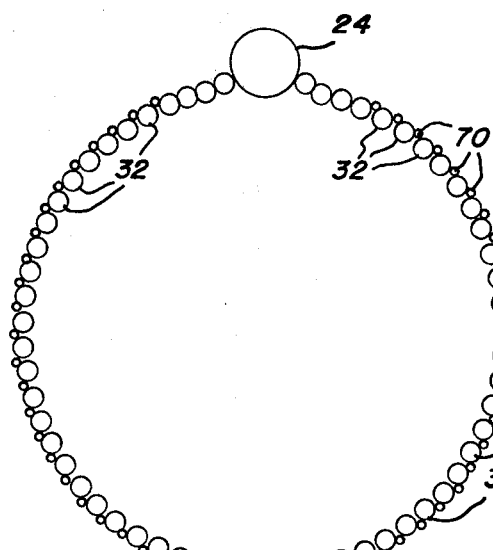
FIG. 3 is a vertical section of the exhaust duct, taken generally along the line 3—3 of FIG. 1.
Figure 4:
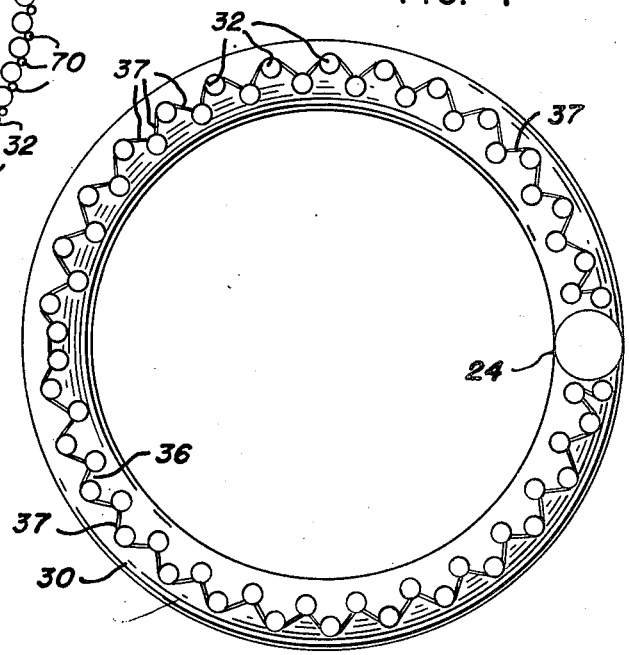
FIG. 4 is a generally horizontal section of the distribution manifold, taken generally along the line 4—4 of FIG. 1.

The present invention contemplates a fluid cooled exhaust duct, generally designated 20 (FIGS. 1, 5 and 6), for use with a high temperature furnace or a steel converting furnace, such as a basic oxygen furnace or the electric arm furnace 22 shown in FIGS. 5 and 6. Recent enactment of air pollution control laws requires the capturing and decontaminating of the furnace exhaust gases which prior thereto were simply vented to the atmosphere. The hot exhaust gases are evacuated from the furnace 22 and directed by the duct 20 to a vertical duct 23 of a dry scrubber or electric precipitator for cleaning. Therefore, to prevent oxidation and destruction of the furnace exhaust duct, the present invention contemplates a means for cooling the exhaust duct to provide a longlasting exhaust duct which can be manufactured at a reasonable cost. The embodiment of exhaust duct 20 shown in the drawings is formed in the shape of an elbow forming an arc of approximately 165°. However, it is contemplated that any other angle, such as 75°, could also be used. The exhaust duct 20 includes a main support, coolant inlet conduit 24 which acts as a support rib for the exhaust duct 20 and forms a portion of the wall thereof. The support conduit 24 is provided with a coolant inlet 28 at one end thereof and is connected on the other end to an annular coolant distribution manifold 30 (FIGS. 1 and 4). A plurality of similarly curved coolant return conduits 32 are secured to one another in a generally circular fashion, as shown by their configuration in FIG. 3, to form the walls of the generally circular exhaust duct 20. The coolant return conduits 32 are connected to the distribution manifold 30 so that coolant will flow to the manifold 30 through the main support conduit 24 and return from the manifold through the return conduits 32. The preferred embodiment contemplates the use of water as the coolant, but any suitable coolant can be used.

Referring to FIG. 4, the return conduits 32 are welded to the distribution manifold 30. Adjacent return conduits 32 are bent slightly as at 34 so that alternating conduits 32 attach on opposite sides of a center line or axis 36 of the manifold 30. This arrangement facilitates complete water-tight welding between each conduit 32 and the manifold 30. A plurality of generally wedge shaped inserts 37 are tack welded between the conduits 32 and the manifold 30 to prevent excessive air inlet leakage. The adjacent return conduits 32 are secured to one another by a plurality of intermittent spot welds 38. This arrangement permits the exhaust duct 20 to perform several functions which cannot be achieved by existing ducts. A small slit or air passageway 40 is provided between adjacent conduits 32 by the intermittent spot welds. When this invention is used with a conventional direct evacuation pollution control system, a low pressure or vacuum is created within the exhaust duct 20 by the fans of the direct evacuation system. This vacuum causes air from the surrounding environment to be drawn into the exhaust duct through the slits or air inlets 40 which serves two functions. Firstly, the incoming air through the slits 40 will cool the exhaust gases because the surrounding air is normally at a temperature lower than the exhaust gases of the furnace 22. However, because the air includes a substantial amount of oxygen, the hot contaminants within the exhaust gas itself may be ignited and caused to burn during its travel along the length of the duct 20. This afterburning effect will prevent possible explosions and damage to the decontamination system which have occurred in the past. Thus exhaust gases from the furnace 22 which enter the duct 20 through the manifold 30 at a temperature which may range from 2800° to 3400° may exit the duct at a temperature range between 2400°, if there is little afterburning of the contaminants, and 3600°, if there are a large amount of contaminants being burned within the duct 20.

Secondly, the slits or spaces 40 between adjacent return conduits 32 permit the individual conduits 32 and therefore the duct 20 to undergo a large amount of expansion due to the rise in temperature without causing failure. In previous double wall cylindrical type ducts it was necessary to provide expansion joints and the like to relieve these thermal stresses. However, in double wall cylindrical ducts it is not possible to provide an effective expansion joint on the internal diameter thereof and many failures have resulted because of this deficiency. In particular, in the event of a power failure, which consequently results in a lack of coolant flow through the cooling jacket, immediate failure of the internal walls usually occurred. The duct 20 of the present invention, because of the spacing provided between adjacent cooling conduits 32 suffers a much smaller degree of failure and in particular during a power outage.

Thirdly, this design feeds all of the coolant through the main coolant conduit 24 to the manifold 30, which prevents significant pre-heating of the coolant before it reaches the end near the furnace. If alternate, smaller conduits were used to feed the coolant to the furnace end of the duct, the coolant would become heated and less efficient on its return trip.

Figure 2:
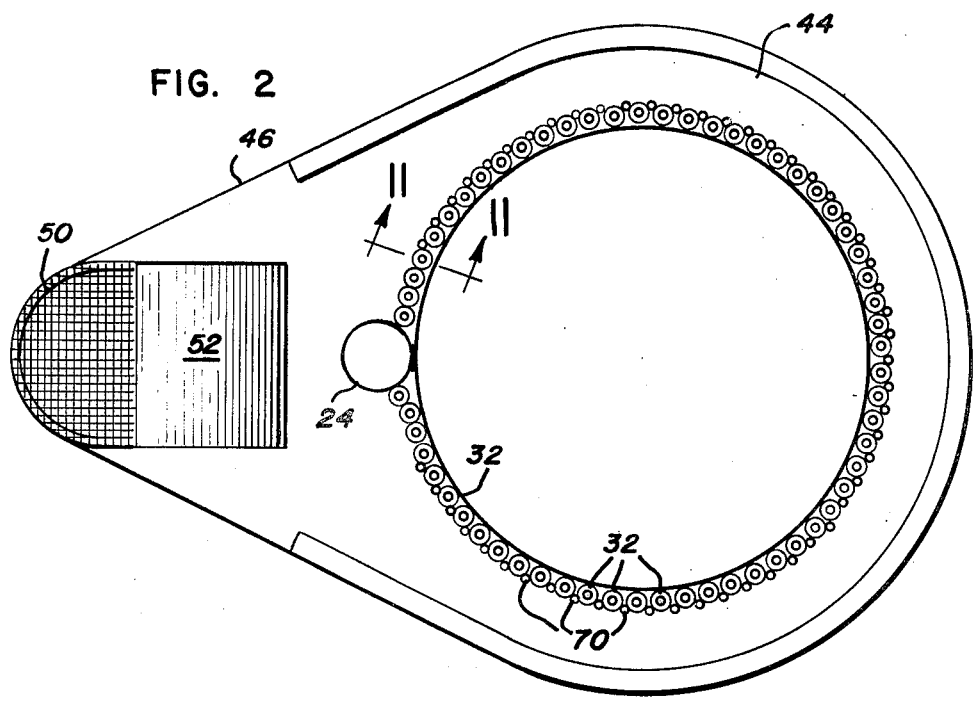
FIG. 2 is a horizontal section of the exhaust duct, showing the coolant discharge trough, taken generally along the lines 2—2 of FIG. 1.

In the preferred embodiment (FIG. 1), the discharge, or lefthand end of the duct 20, includes an open trough 44 as shown in FIG. 2. Of course, a closed trough, similar to the manifold 30, could be used if desired. The trough 44 circumscribes the end of the duct 20 to retain the coolant. The end of each return conduit 32 is open and directs the coolant flowing therethrough into the trough 44 for collection. The trough 44 is circumscribed by a generally vertical flange 46 which extends outwardly to a downwardly directed discharge chute 48. The exit chute 48 includes a generally vertical semicircular wall 50 which is contiguous with the flange 46 and a generally tapered wall portion 52 extending downwardly from the bottom of the trough 44. Referring to FIG. 6, the coolant is directed by the chute 48 into a arcuate collecting trough 56 to be carried out through a drain 58. The arcuate collecting trough 56 is positioned so as to catch the coolant from the chute 48, even when the duct 20 is moved for recharging the furnace. Therefore, the coolant supply does not have to be stopped for recharging of the furnace 23.

In the preferred embodiment, referring to FIG. 11, each of the return conduit 32 includes flow control means, generally designated 60, in the form of a pipe reducer 62. The pipe reducer 62 is adapted to be fit with one of a plurality of reducers which can be manually screwed therein to control the amount of coolant flowing through the conduit 32. In this manner, if some of the conduits 32 are much cooler than some of the other conduits the flow through each conduit can be regulated by changing the reducers at the discharge ends thereof. Additionally, the reducer 62 of each conduit 32 is directed generally toward the discharge chute 48 of the trough 44 to aid in reducing the amount of turbulence within the trough 44. In practice, it has been found desirable to provide the trough 34 with an inwardly tapered top flange 66 to prevent accidental spillage of the coolant. It has also been found helpful to provide a sheath or covering 67 (FIG. 11) around the bottom discharge end of the duct 20 to prevent any of the coolant from passing through the slits 40 into the exhaust duct.

In practice, it has been found that an 8 inch (20.3 cm) inlet conduit 24 can provide a sufficient coolant flow and support for the 60, 2 inch (5 cm) return conduits shown in the exemplary embodiment. It is also contemplated that several of the return conduits 32 which are adjacent the main inlet conduit 24 be increased to 2½ inches (6.3 cm) to provide additional support and rigidity to the duct 20 while also providing an additional amount of coolant to flow along the upper portion of the duct 20 which receives the largest amount of heat. In the preferred embodiment, it has also been found desirable to reduce the amount of air which can enter the duct 20 between adjacent conduits 32 by partially closing the space therebetween with 0.625 inch (1.5 cm) rods 70 (FIG. 3) which are intermittently spot welded therebetween. With these general dimensions, it has been found feasible to manufacture an exhaust furnace duct 20 out of plain carbon steel such as A120 welded tubing or A53 welded or seamless tubing which are capable of withstanding the heat and stress generated by a typical electric furnace.

In the manufacture of steel, it is necessary to extract the steel from the furnace 22 and recharge the furnace with new scrap material. Present electric furnaces are provided with a removable roof 72 so that the furnace can be opened for recharging. To enable the roof 72 to be removed, it is necessary to move the exhaust duct 20 so that the roof 72 can be lifted off of the furnace. A pivotally mounted support mast or cradle, generally designated 74 (FIG. 5), is provided to facilitate the removal of the exhaust duct 20. Referring to FIGS. 5 through 8, the cradle 74 includes a pair of generally semicircular members 76 for engagement with the bottom portion of the duct 20. The members 76 are secured to a rotatable sleeve 78 by a plurality of struts 80. The rotatable sleeve 78 is mounted by an axle 82 which may be secured to a convenient column 84 within the factory. The axle 82 is mounted to the column by a pair of generally horizontal plates 86. The lower plate 86 supports a lower ball bearing race 88. An upper bearing race 90 is provided on the lower end of the sleeve 78 and supported by a plurality of ball bearings 92 upon the lower race 88 for a relatively low friction vertical support. The axle 82 provides horizontal support by a pair of journals 94 mounted within the sleeve 78 having a clearance of approximately 0.010 inches (0.25mm). Preferably, grease fittings 96 are provided for lubricating the journals 94 and a generally cylindrical grease retainer 98 is provided around the lower bearing to maintain sufficient lubrication for the bearings.

An alternate embodiment of the present invention is shown in FIGS. 9, 10 and 12. The alternate embodiment provides for the use of a similar exhaust furnace duct 20 in use with a "wet" decontamination system. In a wet decontamination system, a large volume of water is added to the exhaust furnace gases to quickly lower the temperature thereof and to cause the heavy contaminants to drop out. In the alternate embodiment, like numbers will be used to identify the many similar components. Basically, the wet decontamination system permits the elimination of the collection trough 44 and permits direct use of the cooling fluid, in this case water, for soaking the contaminant gases. Referring to FIG. 9, the bottom end of the inlet conduit 24 and return conduits 32 each include a portion 100 thereof which is directed inwardly, as shown by arrow A (FIG. 9), toward the the center at the discharge end. In this manner, the water which is used to cool the duct 20 mixes with the contaminated exhaust gas to cool the gas and cause the water soaked particles to drop out. The upper end of the vertical stack 23 includes a plurality of hinged doors 102. The doors 102 are hinged to the sides of the vertical column so that they may pivot upwardly as shown by arrow B to permit the escapement of a large amount of steam caused by an "explosion" which may occur with large amounts of unburned gases. Normally, the doors 102 are supported at approximately 45° by a plurality of chains 104 secured to the side walls of the vertical column.

In this embodiment, the duct 20 is pivotally supported to rotate about the vertical axis of the column by a cradle 74 similar to the previously described cradle. However, in this case, the cradle is mounted directly on the vertical column for movement by the ring mounting system, generally designated 108 in FIG. 9.

The ring mounting system 108 includes an upper and lower U-channel 110 formed in a ring about the vertical stack and an angle bracket 112 mounted adjacent each channel 110. The struts 80 of the cradle 74 are secured to an upper and lower circular mounting bracket 114. The brackets 114 mount a plurality, preferably at least four, of horizontal rollers 116 which engage the channels 110 and a plurality of generally vertically mounted rollers 118 for engagement with the horizontal portions of the angle bracket 112 to assist in vertical alignment of the duct 20.

An alternate embodiment of the flow control means 60 is represented in FIG. 12. The alternate embodiment includes a butterfly valve 120 within each of the return conduits 32 upon a pivotally mounted shaft 122. The shaft 122 extends through the side of the conduit 32 for the attachment of a handle (not shown) to facilitate manual adjustment of the butterfly valve 120. As shown in FIG. 12, the diameter of the butterfly valve is preferably smaller than that of the conduit 32 to prevent complete closure and therefore stoppage of all coolant flow in the tube. Additionally, the friction at the journal points of the shaft 122 permit the valve 120 to be set in any predetermined position. Of course, one valve 120 is provided in each of the conduits 32 so that they may all be individually adjusted. It may also be desirable to use a small piece of heat measuring tape on each conduit 32 adjacent the valve 120 so that adjustment can be made for too cool or too hot coolant flow through the valve 120.

The foregoing detailed description has been given for clearness of understanding only and no unnecessary limitations should be understood therefrom as some modifications will be obvious to those skilled in the art.

I claim:

1. A fluid cooled exhaust duct for exhausting a very high temperature furnace, comprising:
    an elongated enlarged coolant supply inlet conduit forming an integral part of the wall of the duct and adapted to be connected to a coolant supply on one end and a distribution manifold on the other end; and
    a plurality of elongated coolant return conduits connected at adjacent ends to said distribution manifold to receive coolant therefrom and return the coolant to a discharge station, said coolant return conduits extending back along said supply inlet conduit to said discharge station, and including means connecting the return conduits to said enlarged supply conduit so as to be supported thereby, and spaced relative to said supply inlet conduit to define an exhaust duct whereby heat transferred thereto by exhaust gas passing through said duct is dissipated by the fluid to prevent destruction of the duct.

2. The exhaust duct of claim 1 wherein the coolant return conduits are arranged in a generally circular fashion to provide a circular duct wall, the axis of the duct formed thereby being generally parallel to the axes of the coolant return conduits.

3. The exhaust duct of claim 2 wherein the enlarged coolant supply inlet conduit is located at the uppermost portion of the duct so that the distribution manifold provides the greatest amount of fluid flow to the coolant return conduits in the area adjacent the coolant supply inlet conduit to provide additional cooling for the uppermost portion of the furnace exhaust duct.

4. The exhaust duct of claim 1 wherein the coolant inlet conduit is substantially larger than each of the coolant return conduits to provide vertical support for the exhaust duct when mounted for use and to provide sufficient fluid flow rate to prevent damage to the return conduits.

5. The exhaust duct of claim 1 wherein the coolant return conduits include means to discharge the coolant into the exhaust gases at the discharge end of the exhaust duct.

6. The exhaust duct of claim 5 wherein the coolant return conduits are arranged in a generally circular fashion to provide a generally circular duct wall, the axis of the duct formed thereby being generally parallel to the axes of the coolant conduits.

7. The exhaust duct of claim 6 wherein the coolant inlet conduit is substantially larger than each of the coolant return conduits to provide vertical support for the exhaust duct when mounted for use and to provide sufficient fluid flow rate to prevent damage to the return conduits.

8. The exhaust duct of claim 1 wherein at least some of the cooling conduits include independently adjustable coolant flow control means to permit independent adjustment of the rate of coolant flow through each of said cooling conduits.

9. The furnace exhaust duct of claim 1 wherein the cooling conduits are only intermittently connected to their adjacent cooling conduits to provide passageways therebetween to permit external air to be introduced through the wall into the duct to permit afterburning of impurities within the furnace exhaust gases along the length of the exhaust duct.

10. A water cooled furnace exhaust duct for use with a blast furnace or the like, comprising:
- a duct wall formed by a plurality of adjacent cooling conduits, the axis of each cooling conduit forming an integral part of the duct wall being generally parallel to the duct axis;
- a support, coolant inlet conduit connected to at least some of the cooling conduits and for supporting the exhaust duct adjacent the furnace, said support coolant inlet being substantially larger than each of the cooling conduits; and
- a manifold connected on the furnace end of the coolant inlet conduit for distributing the coolant to the smaller cooling conduits to thereby provide a self-supporting, water cooled exhaust duct for the furnace.

11. The furnace exhaust duct of claim 10 wherein the cooling conduits are only intermittently connected to their adjacent cooling conduits to provide passageways therebetween to permit external air to be introduced through the wall into the duct to permit afterburning of impurities within the furnace exhaust gases along the length of the exhaust duct.

12. The exhaust duct of claim 10 wherein at least some of the cooling conduits include independently adjustable coolant flow control means to permit independent adjustment of the rate of coolant flow through each of said cooling conduits.

13. A water cooled furnace exhaust duct for use with a blast furnace or the like, comprising:
- a generally circular duct wall formed by a plurality of adjacent cooling conduits, the axis of each cooling conduit being generally parallel to the duct axis and said cooling conduits being intermittently connected to their adjacent cooling conduits to provide passageway therebetween to permit external air to be introduced through the wall into the duct to permit afterburning of impurities within the furnace exhaust;
- a support coolant inlet conduit connected to at least some of the cooling conduits for supporting the exhaust duct on the furnace, said support coolant inlet being substantially larger than each of the cooling conduits, the support coolant inlet comprising part of the duct wall and some of the cooling conduits adjacent the support coolant inlet conduit being slightly larger than the remaining coolant conduits to provide additional support for the duct; and
- a manifold connected on one end to the coolant inlet conduit for distributing the coolant to the smaller cooling conduits to thereby provide a self-supporting, water cooled exhaust duct for the furnace.

14. A fluid cooled furnace exhaust duct for exhausting a high temperature furnace, comprising:
- a duct formed by a plurality of adjacent coolant return conduits, the axis of each coolant conduit being generally parallel to the duct axis;
- a single elongated, enlarged coolant supply inlet conduit connected to at least some of the coolant return conduits and for supporting the exhaust duct adjacent the furnace, the axis of said supply inlet conduit being generally parallel to the duct axis and adapted to be connected to a coolant supply on a first end remote from said furnace; and
- a manifold connected on the other end of the coolant supply inlet conduit and the duct forming coolant return conduits for distributing the coolant to the coolant return conduits to thereby provide a self-supporting, fluid cooled exhaust duct for the furnace.

15. The exhaust duct of claim 14, wherein the coolant return conduits are arranged in a generally circular fashion to provide a circular duct wall, the axis of the duct formed thereby being generally parallel to the axes of the coolant return conduits.

16. The exhaust duct of claim 14 wherein the coolant inlet conduit is substantially larger than each of the coolant return conduits to provide vertical support for the exhaust duct when mounted for use and to provide sufficient fluid flow rate to prevent damage to the return conduits.

17. The exhaust duct of claim 14 wherein the cooling conduits are only intermittently connected to their adjacent cooling conduits to provide passageways therebetween to permit external air to be introduced through the wall into the duct to permit afterburning of impurities within the furnace exhaust gases along the length of the exhaust duct.

18. The exhaust duct of claim 14 wherein at least some of the cooling conduits include independently adjustable coolant flow control means to permit independent adjustment of the rate of coolant flow through each of said cooling conduits.

19. The exhaust duct of claim 14 wherein the enlarged coolant supply inlet conduit is located at the uppermost portion of the duct so that the distribution manifold provides the greatest amount of fluid flow to the coolant return conduits in the area adjacent the coolant supply inlet conduit to provide additional cooling for the uppermost portion of the furnace exhaust duct.

* * * * *